April 20, 1954 C. LE COMTE 2,676,215

WIDE-BAND AMPLIFIER

Filed June 21, 1951

INVENTOR

CORSTIAAN LE COMTE

BY [signature]

AGENT

Patented Apr. 20, 1954

2,676,215

UNITED STATES PATENT OFFICE 2,676,215

WIDE-BAND AMPLIFIER

Corstiaan Le Comte, Hilversum, Netherlands, assignor to Hartford National Bank and Trust Company, Hartford, Conn., as trustee Application June 21, 1951, Serial No. 232,728

Claims priority, application Netherlands July 12, 1950

3 Claims. (Cl. 179—171)

This invention relates to wide-band amplifiers such as are used for amplifying video- or radar-pulse signals (in general step-functions) and the amplification of which is required to be substantially independent of the frequency over a wide frequency range, for example from 25 cycles per sec. to several megacycles per sec.

Known wide-band amplifiers comprising a cascade-pair of resistance-coupled amplifier-tubes entail the difficulty that, due to parasitic capacities (notably the parasitic anode-capacity of the first tube and the grid-capacity of the second tube), the higher frequencies of the signal to be amplified are amplified to a lesser degree than the lower frequencies. In order to counteract the influence of the parisitic anode capacity of the first tube, the anode circuit of this tube usually comprises an impedance consisting of the series-connection of a resistor and an inductance (shunt peaking coil), which inductance compensates for the decrease in amplification due to the parasitic anode-capacity at the highest frequency to be amplified. If the phase curve of the amplifier in the neighbourhood of the higher frequencies does not meet the requirements it may be improved by connecting, for example, a small capacitor in parallel with the said resistor.

A coupling capacitor capable of passing the whole frequency range, inclusive of the lowest frequencies to be amplified, is required for supplying the voltage across the anode impedance of the first tube to the grid-circuit of the second tube. If desired, a small inductance (series peaking coil) may be connected in series with the coupling capacitor to compensate for the decrease in amplification at the highest frequencies due to the parasitic grid-capacity of the second tube.

Although the "shunt peaking coil" and the "series peaking coil" yield a considerable improvement in the response curve, the detrimental effect of the said parasitic capacities is still present to an undesirable extent in the known circuits.

The present invention provides a circuit-arrangement in which the natural capacity of the electrodes of the coupling capacitor with respect to earth, which in the known circuits described above is in parallel with the detrimental anode-capacity of the first tube or with the grid-capacity of the second tube, becomes operative parallel to the anode resistor, thus also improving the phase curve.

According to the invention provision is made of a winding which is inductively coupled to the anode inductance of the first tube and has one end conductively connected to the grid of the second amplifier tube whilst the other end is connected through the coupling capacitor to the series-connection of resistor and inductance at a point located between this resistor and inductance.

In order that the invention may be readily carried into effect, two examples will now be described with reference to the accompanying drawing.

Figure 1:
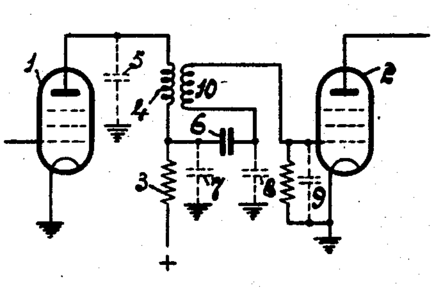

Fig. 1 thereof shows a circuit-arrangement according to the invention in which the voltage supplied to the second tube is equal to that across the whole anode impedance of the first tube.

Figure 2:
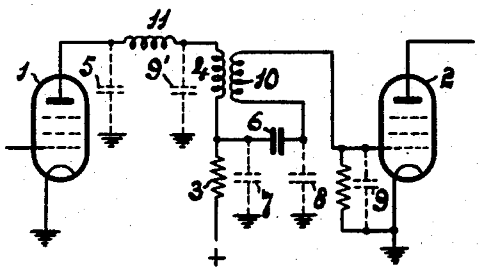

Fig. 2 shows an embodiment of the invention wherein the anode circuit of the first tube comprises a filter-network and part of the voltage is supplied through this network to the second tube.

In the circuit-arrangement shown in Fig. 1, the reference numeral 1 denotes a first amplifier tube and the numeral 2 a second amplifier tube of a wide-band amplifier for signal amplification over a very wide frequency range, for example 25 cycles per sec. to 10 to 20 megacycles per sec. The anode circuit of tube 1 comprises a resistor 3 connected in series with a small inductance 4 (shunt peaking coil) such that the voltage produced across this series-connection is practically frequency-independent throughout the frequency range of the oscillations to be amplified despite the parasitic anode-capacity 5 of tube 1.

In the known arrangements using the shunt peaking coil, voltage is supplied to the grid circuit of tube 2 from the series-connection 3, 4 through a coupling capacitor 6 (for example one of 50,000 pf.). In this case, the parasitic capacities 7 and 8 of the electrodes of this coupling condenser 6 with respect to earth will be located in parallel with the parasitic anode capacity 5 of tube 1 and the parasitic grid capacity 9 of tube 2 respectively, thus adversely affecting the amplification curve. According to the invention this is avoided by providing a winding 10 which is inductively coupled to the inductance 4 and has one end conductively connected to the grid of tube 2 while its other end is connected through the coupling capacitor 6 to a point between the resistor 3 and the inductance 4.

The voltage produced across resistor 3 is increased by the voltage across the winding 10 and subsequently supplied to the grid of tube 2. With a transformation ratio of 1:1 for the windings 4 and 10 the voltage supplied to tube 2 is consequently equal to the voltage across the series-connection of resistor 3 and inductance 4. In this case, however, the parasitic capacities 7 and 8 of the electrodes of the coupling capacitor 6 with respect to earth are no longer in parallel with the detrimental parasitic capacity 5, but with the resistor 3 with the result that the phase curve in the neighbourhood of the highest frequency is improved if the said capacity 7 has a suitable value. The amplifier then appears to have a 20 to 30% greater band-width with the same amplification as that obtained in the absence of the invention.

If the coupling factor between the windings 4 and 10 lies between 0.75 and 0.9, for example approximately 0.8, a further improvement of the amplification curve and phase curve is obtainable inter alia because the leakage inductance produced in the grid-circuit of tube 2 will act as a "series peaking coil" and will thus reduce the influence of the parasitic capacity 9.

In Fig. 2, in which the same reference numerals are used as in Fig. 1, the anode circuit of the tube 1 comprises a filter-network consisting of the said resistor 3 with a low parallel capacity, inductance 4, and a further inductance 11 connected in series with the inductance 4. The ends of inductance 11 have a capacity 5 and 9′ respectively with respect to earth. In a known circuit-arrangement comprising two inductances such as 11 and 4 in series, their junction is linked through the coupling capacitor 6 to the grid of tube 2. In this way, however, the capacity 9′ is unnecessarily increased since in this case not only the parasitic grid capacity 9 of tube 2 but also the parasitic capacities 7 and 8 of the electrodes of the coupling capacitor 6 contribute to the capacity 9′.

According to the invention provision is again made of a winding 10 which is inductively coupled to the inductance 4 and has one end conductively connected to the grid of tube 2, while its other end is connected through coupling capacitor 6 to a point between the inductance 4 and the resistor 3. In this case, the junction of the inductances 11 and 4 has, with respect to earth, a capacity 9′ which, if the inductances 4 and 10 are closely coupled, corresponds to the parasitic grid capacity 9 of tube 2, the parasitic capacities 7 and 8 of the electrodes of the coupling capacitor 6 with respect to earth contributing to the initially-required capacity parallel to the resistor 3.

A further improvement is obtainable by connecting the grid-leak resistor of tube 2, not, as shown in the drawing, in parallel with the grid capacitance 9 of tube 2 but in parallel with the capacitance 8, with the result that this grid-capacitance 9 may also be reduced.

What I claim is:

1. A wide-band amplifier for amplifying signals in a frequency range extending from a point in the audio frequency band to at least approximately one megacycle comprising first and second amplifying stages each including an electron discharge tube having a cathode, a grid, and an anode and circuits therefor, means to apply said signals to the grid of said first stage, an impedance in the anode circuit of the first stage which is substantially frequency-independent within said range and which includes a resistor in series with a shunt peaking coil, said coil having a peak response compensating for a decrease in amplification in the higher frequency portion of said signal range, a capacitor for passing frequencies in said range connected between the junction of the series-connected coil and resistor and the grid of the second stage, said capacitor being subject to parasitic capacitance relative to ground, a winding interposed between the grid of said second stage and said capacitor, said winding being inductively coupled to said coil, said winding and said coil having a coupling factor and relative impedance values predetermined to compensate for the decrease in amplification in the higher frequency portion of said range due to said parasitic capacitance, and means to derive the amplified signals from the anode circuit of said second stage.

2. An amplifier as claimed in claim 1, characterized in that the coupling factor between the inductance and the winding has a value between 0.75 and 0.9.

3. An amplifier as claimed in claim 1, characterized in that the anode circuit of the first tube includes, in series with the said inductance, a second inductance which together therewith and with the parasitic capacities and the resistor constitutes a filter-network.

References Cited in the file of this patent

UNITED STATES PATENTS

| Number | Name | Date |
|---|---|---|
| 2,240,295 | Grundman | Apr. 29, 1941 |
| 2,581,159 | Achenbach | Jan. 1, 1952 |